United States Patent [19]

Yoerger

[11] Patent Number: 4,726,994

[45] Date of Patent: Feb. 23, 1988

[54] METHOD OF MODIFYING THE CHARGING PROPENSITY OF CARRIER PARTICLES FOR ELECTROSTATOGRAPHIC DEVELOPERS AND CARRIER PARTICLES PRODUCED THEREBY

[75] Inventor: William E. Yoerger, Rochester, N.Y.

[73] Assignee: Eastman Kodak Company, Rochester, N.Y.

[21] Appl. No.: 16,816

[22] Filed: Feb. 20, 1987

[51] Int. Cl.[4] .................... B32B 15/02

[52] U.S. Cl. .................... 428/403; 428/407; 427/222; 427/214; 430/108; 430/137

[58] Field of Search .................... 428/407, 403; 427/222, 427/214; 430/108, 137

[56] References Cited

U.S. PATENT DOCUMENTS

| | | | |
|---|---|---|---|
| 3,873,355 | 3/1975 | Queener et al. | 428/407 |
| 3,970,571 | 7/1976 | Olson et al. | 430/108 |
| 4,076,857 | 2/1978 | Kasper et al. | 430/108 |
| 4,125,667 | 11/1978 | Jones | 428/407 |
| 4,147,834 | 4/1979 | Munzel et al. | 428/407 |
| 4,478,925 | 10/1984 | Miskinis | 430/137 |
| 4,546,060 | 10/1985 | Miskinis et al. | 430/108 |

OTHER PUBLICATIONS

Kise, H. and Ogata, H., *Journal of Polymer Science: Polymer Chemistry Edition*, vol. 21 (1983) pp. 3443-3451.

*Primary Examiner*—Marion C. McCamish
*Assistant Examiner*—C. L. Buczek
*Attorney, Agent, or Firm*—David F. Janci

[57] ABSTRACT

The invention provides a method of modifying the triboelectric charging propensity of carrier particles coated with a fluorohydrocarbon polymer. The method comprises dehydrofluorinating and oxidizing the polymer by contacting the coated particles with a basic solution and a solution of an oxidizing agent. The resulting new particles have less fluorine atoms bonded to the coated polymer and also have oxygen atoms bonded thereto.

13 Claims, No Drawings

METHOD OF MODIFYING THE CHARGING PROPENSITY OF CARRIER PARTICLES FOR ELECTROSTATOGRAPHIC DEVELOPERS AND CARRIER PARTICLES PRODUCED THEREBY

FIELD OF THE INVENTION

This invention relates to the preparation of carrier particles intended to be mixed with toner particles to form a dry electrostatographic developer. More particularly, the invention concerns a method of modifying the triboelectric charging propensity of particles coated with a fluorohydrocarbon polymer.

BACKGROUND

In electrostatography an image comprising an electrostatic field pattern, usually of non-uniform strength, (also referred to as an electrostatic latent image) is formed on an insulative surface of an electrostatographic element by any of various methods. For example, the electrostatic latent image may be formed electrophotographically (i.e., by imagewise photo-induced dissipation of the strength of portions of an elecrtostatic field of uniform strength previously formed on a surface of an electrophotographic element comprising a photoconductive layer and an electrically conductive substrate), or it may be formed by dielectric recording (i.e., by direct electrical formation of an electrostatic field pattern on a surface of a dielectric material). Typically, the electrostatic latent image is then developed into a toner image by contacting the latent image with an electrostatograhic developer. If desired, the latent image can be transferred to another surface before development.

One well known type of electrostatographic developer comprises a dry mixture of toner particles and carrier particles. Developers of this type are commonly employed in well known electrostatographic development processes such as cascade development and magnetic brush development. The particles in such developers are formulated such that the toner particles and carrier particles occupy different positions in the triboelectric continuum, so that when they contact each other during mixing to form the developer, they become triboelectrically charged, with the toner particles acquiring a charge of one polarity and the carrier particles acquiring a charge of the opposite polarity. These opposite charges attract each other such that the toner particles cling to the surfaces of the carrier particles. When the developer is brought into contact with the latent electrostatic image, the electrostatic forces of the latent image attract the toner particles, and the toner particles are pulled away from the carrier particles and become electrostatically attached imagewise to the latent image-bearing surface. The resultant toner image can then be fixed in place on the surface by application of heat or other known methods (depending upon the nature of the surface and of the toner image) or can be transferred to another surface, to which it then can be similarly fixed.

A number of requirements are implicit in such development schemes. Namely, the electrostatic attraction between the toner and carrier particles must be strong enough to keep the toner particles held to the surfaces of the carrier particles while the developer is being transported to and brought into contact with the latent image, but when that contact occurs, the electrostatic attraction between the toner particles and the latent image must be even stronger, so that the toner particles are thereby pulled away from the carrier particles and deposited on the latent image-bearing surface.

Many known dry, two-component electrostatographic developers contain thermoplastic toner particles and carrier particles that comprise a core material coated with a fluorohydrocarbon polymer, such as poly(vinylidene fluoride) or poly(vinylidene fluoride-co-tetrafluoroethylene). See, for example, U.S. Pat. Nos. 4,546,060; 4,478,925; 4,076,857; and 3,970,571. Such polymeric fluorohydrocarbon carrier coatings can serve a number of known purposes. One such purpose can be to aid the developer to meet the electrostatic force requirements mentioned above by shifting the carrier particles to a position in the triboelectric series different from that of the uncoated carrier core material, in order to adjust the degree of triboelectric charging of both the carrier and toner particles. Another purpose can be to reduce the frictional characteristics of the carrier particles in order to improve developer flow properties. Still another purpose can be to reduce the surface hardness of the carrier particles so that they are less likely to break apart during use and less likely to abrade surfaces (e.g., photoconductive element surfaces) that they contact during use. Yet another purpose can be to reduce the tendency of toner material or other developer additives to become undesirably permanently adhered to carrier surfaces during developer use (often referred to as scumming). A further purpose can be to alter the electrical resistance of the carrier particles. All of these, and even more, purposes are well known in the art for polymeric fluorohydrocarbon carrier coatings.

However, while such carrier coatings can serve all of the above-noted purposes well, in some cases they do not adequately serve some or all of those purposes simultaneously. For example, in some developer compositions, polymeric fluorohydrocarbon carrier coatings can serve many of the above-noted purposes well, but, depending upon the nature of the toner particles and carrier core material desired to be included in the developer, such carrier coatings can cause the developer to acquire a triboelectric charge that is too high for optimum developer performance; i.e., the electrostatic latent image has difficulty pulling the toner particles away from the carrier particles. This is especially true in some positively charged developers (developers in which the toner particles triboelectrically acquire a positive charge, and the polymeric fluorohydrocarbon-coated carrier particles acquire a negative charge).

One method of modifying the triboelectric charging propensity of carrier particles having a fluorohydrocarbon polymer coating is described in my copending U.S. patent application Ser. No. 932,847, filed Nov. 20, 1986, the disclosure of which is hereby incorporated herein by reference. That method comprises dehydrofluorinating the polymeric coating by contacting the coated particles with a basic solution. While that method is quite effective for modifying charging propensity, for some applications the degree of charging propensity that can result from that method is still higher that would be optimum.

Therefore, it would be desirable to have a convenient method of modifying the triboelectric charging propensity of particles coated with a fluorohydrocarbon polymer, so that the particles could be used as carriers that exhibit the beneficial properties noted above in electrographic developers but do not cause certain developers to acquire an undesirable magnitude of triboelectric charge. The present invention provides such a method.

SUMMARY OF THE INVENTION

The invention provides a method of modifying the triboelectric charging propensity of particles coated with a fluorohydrocarbon polymer for use as carriers in electrostatographic development. The method comprises dehydrofluorinating the polymeric coating by contacting the coated particles with a basic solution, and oxidizing the polymeric coating by contacting the coated particles with a solution of an oxidizing agent.

The inventive method provides new carrier particles comprising a core material having a polymeric coating comprising a fluorohydrocarbon polymer that has been modified by removing fluorine atoms from and bonding oxygen atoms to the coated polymer.

The inventive method is thought to have the effect of altering the chemical structure of some of the repeating units of the polymeric fluorohydrocarbons.

Contacting the coated particles with a basic solution is thought to cause dehydrofluorination by removing some of the hydrogen and fluorine atoms from some of the repeating units and adding a degree (or greater degree) of unsaturation to those units. While the exact structure of the dehydrofluorinated units is now known, it is hypothesized that the dehydrofluorination step of the method produces a variety of unsaturated (vinylic-type and acetylenic-type) structural units in the polymers at and near the outer surface of the polymeric coatings.

Contacting the coated particles with a solution of an oxidizing agent, either simultaneously with or subsequent to the contacting with basic solution, is hypothesized to cause oxidation of the unsaturated units provided by the dehydrofluorination, the effect being to bond oxygen atoms to those unis. e.g., in he form of hydroxy or oxo moieties.

This change in chemical structure has the effect to repositioning the carrier particles toward the higher (more positive, less negative) end of the triboelectric series. The carriers will then have a tendency to triboelectrically charge less negatively, than untreated carriers or carriers that have only been subjected to a dehydrofluorination treatment under similar conditions of time, temperature, and concentration. The inventive carriers can then be used in place of such other carriers to create, instead, a magnitude of positive developer charge (referring to the charge on the toner particles), in a lower, more acceptable range. In addition, the inventively treated fluorohydrocarbon carrier coatings retain their capability of serving the other known purposes of polymeric fluorohydrocarbon carrier coatings, mentioned previously herein.

DESCRIPTION OF PREFERRED EMBODIMENTS

In carrying out the method of the invention, the coated carrier particles are brought into contact with a basic solution to effect the spontaneous dehydrofluorination reaction of the base with the polymeric fluorohydrocarbon coatings. This is simply accomplished by mixing the coated particles with the basic solution. Preferably, the mixture is continuously agitated during the reaction to assure that all surfaces of the coatings are contacted by the base and that the degree of reaction is fairly uniform at all surface areas of the coatings.

Dehydrofluorination of polymeric fluorohydrocarbons such as poly(vinylidene fluoride) by treatment with basic solutions is generally known in the chemical arts (although it is not known, other then by a reading of my copending U.S. patent application Ser. No. 932,847, filed Nov. 20, 1986, that such a treatment can be employed to beneficially alter the triboelectric charging propensity of carrier particles coated with such polymers), and it is known that when such treatments are applied to a polymeric fluorohydrocarbon in film form, the dehydrofluorination occurs mainly near the surface of the film that is contacted with the basic solution. See, for example, Kise, H. and Ogata, H., "Phase Transfer Catalysis in Dehydrofluorination of Poly(vinylidene Fluoride) by Aqueous Sodium Hydroxide Solutions", *Journal of Polymer Science: Polymer Chemistry Edition.*, Vol. 21 (1983) pp. 3443–3451. This holds true for the method of the present invention.

The oxidation step of the inventive method can be simply accomplished by mixing the dehydrofluorinated coated particles with a solution of an oxidizing agent to effect the spontaneous oxidation reactions contemplated. However, it is simpler, more efficient, and thus preferable to carry out the dehydrofluorination and oxidation steps simultaneously by contacting the untreated coated carrier particles with a combined solution of a base and an oxidizing agent, while, of course, taking care not to choose bases and oxidants that might adversely react with each other.

Both the depth of dehydrofluorination and oxidation of the coatings and the degree of reaction, i.e., the amount of dehydrofluorination and oxidation of individual molecules of the polymers at and near the outer surfaces of the coatings (which is different from the depth of the treatment), can be varied somewhat by altering parameters of the process. For example, degree of reaction and depth of the coating affected by the process can be increased somewhat by increasing concentration of base and oxidant in the treating solution, by lengthening time of treatment, or by raising the temperature of the reactants. Altering the degree of reaction, and, to some extent, the depth thereof, alters the degree of change in triboelectric charging propensity of the coated carrier particles; that is, the greater the depth and the higher the degree of reaction, the more the particles are repositioned toward the higher (more positive, less negative) end of the triboelectric series. The optimum time, temperature, and concentrations to be used in any instance will depend upon the particular base, oxidant and polymeric coating involved and the particular triboelectric charging propensity desired to be effected.

For purposes of some of the preferred embodiments, base and oxidant concentrations from a trace to about 15 percent by weight of total solution were found to yield beneficial effects, depending upon the particular base, oxidant and polymeric coatings involved, but higher concentrations would also be useful and have no detrimental effect and would perhaps be preferred in some cases.

Also, in some of the preferred embodiments a time of treatment of about 1 to 2 hours was found to be optimum (in consideration of the depth of polymeric coating material expected to wear away during the otherwise useful life of the carriers in preferred developers), but longer and shorter times can also be preferred in other cases, depending upon the nature of developer, type of development process, type of development apparatus, amount of useful carrier life needed, etc., that are involved in any particular instance.

Temperatures ranging from room temperature (about 21° C. to 28° C.) to a temperature just below the melting point of the particular polymeric coating involved were found to be useful in some embodiments.

It was also noted that changing temperature could produce competing effects. Namely, increasing temperature generally tends to produce an increased depth and a higher degree of dehydrofluorination and oxidation, but also the closer the temperature is to the melting point of the polymeric coating, the greater the tendency of individual molecules of the polymer to migrate within the coating. Since the dehydrofluorination and oxidation occur mainly near the surface of the coating, increased migration will allow molecules of the polymeric coating that have not reacted (or that have reacted to a lesser degree) to migrate toward the surface of the coating, thus tending to lessen the noticeable degree of effective modification near the surface. In fact, if, after the inventive process has been carried out (i.e., after the treating solutions have been separated from the carrier particles), one heats the coated particles to a temperature above the melting point of the polymeric coating, the triboelectric charging propensity of the coated particles can eventually be brought back to very near the level of charging propensity exhibited before the inventive process was carried out. Therefore it is preferred to keep the temperature of the reactants significantly below the melting point of the polymeric fluorohydrocarbon coating, so as not to undo what one is trying to accomplish. It should be noted that fluorohydrocarbon coatings for carrier particles are already typically chosen such that their melting points are significantly higher than the temperatures likely to be encountered in electrostatographic development, so as not to scum the recording elements or development apparatus which such materials. Thus, no significant reversal of the desirable effects achieved by the present inventive process is likely to occur during normal developer use of the carrier particles after treatment in accordance with the invention.

Virtually any basic material or combination of basic materials can be employed in the inventive process. For example, good results have been achieved with metal hydroxides, such as KOH and NaOH; ammonium hydroxides, such as $NH_4OH$ and $(CH_3)_4NOH.5H_2O$; amine salts, such as $NaNH_2$, and other bases, such as $Na_2CO_3$.

Virtually any oxidizing agent or combination of oxidizing agents can be employed in the inventive process. However it is preferred that the oxidant system not have significant acidic characteristics, in order to avoid possible adverse reactions between the oxidant and base and to avoid possible effects that might compete with the purpose of the method, e.g., the possible undesirable introduction of strongly anionic species into the polymeric coating. Good results have been achieved in the inventive method, even where a combined basic/oxidizing solution has been used, with aqueous solutions of oxidants such as potassium permanganate, potassium periodate, and hydrogen peroxide.

In the dehydrofluorinating step, it is preferred that the solution of base employed in the inventive process be an aqueous or alcoholic solution to aid in solvating and carrying away the hydrogen and fluorine ions removed from the polymeric coatings during the process. Alcoholic or aqueous/alcoholic solutions are most preferred for the dehydrofluorinating step, because of their superior ability to wet the entire surface of the polymeric fluorohydrocarbon coating during the treatment. However, when the preferred combined solution of base and oxidant is employed, it is preferable to use an aqueous, non-alcoholic solvent to avoid adverse reactions that might otherwise occur between the oxidant of choice and an alcohol.

The method of the invention is applicable to any known or new carrier particles having polymeric fluorohydrocarbon coatings on their outer surfaces.

The carrier core materials can comprise conductive, non-conductive, magnetic, or non-magnetic materials. For example, carrier cores can comprise glass beads; crystals of inorganic salts such as sodium chloride, potassium chloride or aluminum potassium chloride; other salts such as ammonium chloride or sodium nitrate; granular zircon; granular silicon; silicon dioxide; hard resin particles such as poly(methyl methacrylate); metallic materials such as iron, steel, nickel, carborundum, cobalt, oxidized iron; or mixtures or alloys of any of the foregoing. See, for example, U.S. Pat. Nos. 3,850,663 and 3,970,571. Especially useful in magnetic brush development schemes are iron particles such as porous iron particles having oxidized surfaces, steel particles, and other "hard" or "soft" ferromagnetic materials such as gamma ferric oxides or ferrites, such as ferrites of barium, strontium, lead, magnesium, or aluminum. See, for example, U.S. Pat. Nos. 4,042,518; 4,478,925; and 4,546,060. In preferred embodiments of the invention specifically illustrated in the examples below, "soft" magnetic materials such as stainless steel and "hard" magnetic materials such as strontium ferrites are employed.

Many polymeric fluorohydrocarbon compounds are known to serve as useful coatings on such carrier core materials, e.g., poly(vinylidene fluoride) or poly(vinylidene fluoride-co-tetrafluoroethylene), and many methods of applying such coatings in a continuous or discontinuous configuration of various uniform or non-uniform thicknesses are also well known. Some useful coating methods include solvent coating, spray application, plating, tumbling, shaking, fluidized bed coating, and melt coating, of which melt coating is usually preferred. See for example, U.S. Pat. Nos. 4,546,060; 4,478,925; and 4,233,387. In preferred embodiments of the invention specifically illustrated in the examples below, the coatings comprise poly(vinylidene fluoride) melt coated on the carrier core materials.

Carrier particles modified by the method of the present invention can be used in combination with virtually any type of toner particles known in the art to be useful in combination with fluorohydrocarbon-coated carrier particles and with any of the sizes and size ratios known to be useful for such particles, to serve as dry electrostatographic developers in any of the well known dry electroscopic development schemes, e.g., cascade development or magnetic brush development.

The following examples are presented to further illustrate some preferred modes of practice of the method of the invention and to compare the triboelectric properties of inventive carrier particles produced by the inventive method to those properties of similar carrier particles not treated in accordance with the invention.

In all of the examples, except Example 6, the starting carrier particles comprised strontium ferrite carrier cores melt-coated with poly(vinylidene fluoride). They were prepared by using a formulation comprising 1 percent by weight poly(vinylidene fluoride) and 99 percent by weight strontium ferrite particles. Two kilograms of the formulation were placed in a 4-liter wide-mouth glass jar and capped. The jar was vigorously shaken by hand and then roll-milled for 15 minutes at 140 revolutions per minute. The cap was then removed, and the jar was placed in a convection oven set at a temperature of 230° C. for 4 hours. After cooling to room temperature, the coated particles were passed through a sieve having 62-micrometer openings to break up any large agglomerates.

In some of the examples the triboelectric properties of the carrier particles are indirectly determined by measuring the degree of charge imparted to toner particles with which they are mixed. Since in each example the intent is to measure toner charge imparted by carrier particles treated in accordance with the invention relative to toner charge imparted by similar carrier particles not treated in accordance with the invention, any known convenient method for measuring toner charge can be used. One such method comprises plating the toner by electrical bias onto the electrically insulating layer of a test element. This element is composed of, in sequence, a film support, an electrically conducting (i.e., ground) layer and the insulating layer. The amount of plating is controlled to produce a mid-range optical density of about 0.3. The test element containing the plated toner is connected via the ground layer to an electrometer. The plated toner is then rapidly removed by forced air, causing a flow of electric current to register in the electrometer as a charge, in microcoulombs. The registered charge is divided by the weight of the removed toner to obtain the toner charge in microcoulombs per gram (μc/g).

In some of the examples the atomic content of the coated carrier particles is measured. Since in each case the intent is to compare relative atomic content of two or more types of coated carrier, any known convenient method of analysis can be used. One such method is Electron Spectrocspy for Chemical Analysis (ESCA), which enables measurement of the atomic percentage (percent by number of atoms) of each different chemical element present at or near the surface of the coated carrier.

In Examples 1-4, all percentages are by weight.

EXAMPLE 1

This example illustrates the beneficial modification of charging propensity produced by the method of the invention. It also illustrates the beneficial effect of elevating the treatment temperature (while keeping the temperature significantly below the 160-165° C. melting temperature of the poly(vinylidene fluoride) coating). Also shown is the effect of changing the concentration of base in the treating solution.

To 40 g portions of strontium ferrite core particles coated with 1 percent by weight poly(vinylidene fluoride) were added 60 ml portions of distilled water containing 2 percent by weight $KMnO_4$ and various concentrations of KOH. The mixtures were stirred for 2 hours on a controlled temperature bath at various temperatures. The mixtures were then filtered through glass fiber, and the solids were washed five times on the filter with distilled water, reslurried with 250 ml distilled water, refiltered, and dried in a 50-55° C. vacuum oven.

To 0.87 g samples of the treated carriers and an untreated control were then added 0.13 g portions of magenta-colored toner particles containing a polyester resin binder. The samples were shaken for 3 minutes to mix them and cause triboelectric charging. The toner charge was then measured, and the data obtained are listed in Table I.

TABLE I

| Aqueous Treating Solution | | Treatment | Toner Charge |
|---|---|---|---|
| % $KMnO_4$ | % KOH | Temp., °C. | (μc/g) |
| (untreated control) | | — | 63.8 |
| 2 | 0.5 | 26.7 | 22.1 |
| 2 | 0.5 | 32.2 | 21.7 |
| 2 | 0.5 | 37.8 | 17.4 |
| 2 | 0.5 | 43.3 | 8.4 |
| 2 | 1 | 26.7 | 23 |
| 2 | 1 | 32.2 | 15.6 |
| 2 | 1 | 37.8 | 8 |
| 2 | 4 | 26.7 | 20.4 |
| 2 | 4 | 32.2 | 9.6 |
| 2 | 4 | 37.8 | 5.1 |

The data in Table I indicate that the inventive method significantly reduced the electrical charge of the toner and coated carrier. Higher temperatures and higher concentrations of base further decreased the charging propensity.

EXAMPLE 2

This example illustrates the successful use of other oxidants at various concentrations of oxidant and base and at various temperatures. Carrier samples were prepared as in Example 1, except that the components of the aqueous treating solutions were as indicated in Table II, and the treatments were carried out while rolling containers of the mixtures on a controlled temperature roll mill. Samples were mixed with toner as in Example 1, and the toner charges were then measured and are listed in Table II.

TABLE II

| Aqueous Treating Solution | Treatment Temp., °C. | Toner Charge (μc/g) |
|---|---|---|
| untreated control | — | 68.2 |
| 1% $KIO_4$ + 8% KOH | 21.1 | 29.0 |
| 1% $KIO_4$ + 8% KOH | 32.2 | 22.3 |
| 2% $KIO_4$ + 8% KOH | 32.2 | 22.8 |
| 2% $KIO_4$ + 8% KOH | 37.8 | 14.1 |
| 1% $H_2O_2$ + 4% KOH | 21.1 | 40.3 |
| 2% $H_2O_2$ + 4% KOH | 21.1 | 35.9 |

EXAMPLE 3

This example illustrates the improved effect of the inventive method over treatment with just a basic solution, treatment with just an oxidizing solution, or no treatment at all.

Carrier samples were prepared and treated as in Example 2 (at a temperature of about 27°-28° C. with components as indicated in Table III) and mixed with toner as in Example 2. Toner charges were measured and are listed in Table III.

TABLE III

| Inventive Treatment? | Treating Solution | Toner Charge, μc/g |
|---|---|---|
| no | untreated control | 68.2 |
| no | 2% KOH in isopropanol | 41.7 |
| no | 4% KOH in water | 45.6 |
| no | 8% KOH in water | 37.6 |
| no | 2% $KMnO_4$ in water | 59.4 |
| no | 1% $KIO_4$ in water | 61.4 |

TABLE III-continued

| Inventive Treatment? | Treating Solution | Toner Charge, μc/g |
|---|---|---|
| yes | 2% $KMnO_4$ + 4% KOH in water | 30.1 |
| yes | 1% $KIO_4$ + 8% KOH in water | 29.0 |

EXAMPLE 4

This example illustrates the successful use of another base in the inventive method. Samples were prepared, treated, and measured as in Example 2, except that the method was carried out at 37.8° C., and the solution components were as indicated in Table IV, along with results.

TABLE IV

| Aqueous Treating Solution | Toner Charge, μc/g |
|---|---|
| untreated control | 68.2 |
| 2% $KMnO_4$ + 4% Na | 32.8 |
| 2% $KMnO_4$ + 8% Na | 27.6 |

Examples 5 and 6 are intended to indicate the elemental content of inventive coated carriers produced by the inventive method compared to untreated coated carriers. All percentages are by number of atoms unless otherwise indicated.

EXAMPLE 5

This example illustrates the decrease in fluorine content and increase in oxygen content of poly(vinylidene fluoride)-coated strontium ferrite carriers treated in accordance with the invention compared to similar carriers that were untreated.

The treated carriers were prepared as in Example 2 with an aqueous treating solution containing 2% by weight $KMnO_4$ and 8% by weight KOH and a treatment temperature of 32.2° C. Results are listed in Table V.

TABLE V

| Element | Atomic % | |
|---|---|---|
| | Untreated Control | Treated Carrier |
| F | 28.92 | 21.11 |
| O | 21.29 | 34.10 |
| C | 39.34 | 31.59 |
| S | 0.89 | 0 |
| Sr | 2.37 | 3.62 |
| Fe | 7.20 | 7.45 |
| Mn | 0 | 1.28 |
| Na | 0 | 0.85 |

EXAMPLE 6

This example was carried out analogously to Example 5, except that the carrier core material was stainless steel. The results are listed in Table VI and illustrate the expected increase in oxygen content and decrease in fluorine content for treated carrier.

TABLE VI

| Element | Atomic % | |
|---|---|---|
| | Untreated Control | Treated Carrier |
| F | 58.14 | 35.49 |
| O | 0.22 | 27.29 |
| C | 41.66 | 36.74 |
| Mn | 0 | 0.48 |

The invention has been described in detail with particular reference to certain preferred embodiments thereof, but is should be understood that variations and modifications can be effected within the spirit and scope of the invention.

What is claimed is:

1. A method of modifying the triboelectric charging propensity of particles coated with a fluorohydrocarbon polymer for use as carriers in electrostatographic development, comprising:
   dehydrofluorinating the polymer by contacting the coated particles with a basic solution; and
   oxidizing the polymer by contacting the coated particles with a solution of an oxidizing agent.

2. The method of claim 1, wherein the dehydrofluorinating and oxidizing steps are carried out simultaneously.

3. The method of claim 1, wherein the fluorohydrocarbon polymer is poly(vinylidene fluoride).

4. The method of claim 1, wherein the basic solution comprises an aqueous solution of potassium hydroxide or sodium carbonate.

5. The method of claim 1, wherein the solution of oxidizing agent comprises an aqueous solution of potassium permanganate, potassium periodate, or hydrogen peroxide.

6. The method of claim 1, wherein the coated particles comprise metallic core material coated with the fluorohydrocarbon polymer.

7. The method of claim 6, wherein the metallic core material is ferromagnetic.

8. The method of claim 6, wherein the metallic core material comprises strontium ferrite.

9. The method of claim 1, wherein the method is carried out at an elevated temperature less than the melting point of the fluorohydrocarbon polymer.

10. A carrier particle for use in electrostatographic development, comprising a core material having a polymeric coating comprising a fluorohydrocarbon polymer that has been modified by removing fluorine atoms from and bonding oxygen atoms to the coated polymer.

11. The carrier particle of claim 10, wherein the core material is metallic.

12. The carrier particle of claim 11, wherein the metallic core material is ferromagnetic.

13. The carrier particle of claim 11, wherein the metallic core material comprises strontium ferrite.

* * * * *